United States Patent [19]

Freisleben et al.

[11] Patent Number: 4,930,888
[45] Date of Patent: Jun. 5, 1990

[54] SITUATION DISPLAY SYSTEM FOR ATTACHMENT TO A HEADGEAR

[75] Inventors: Horst Freisleben, Grafing; Gottfried Scharfenberg, Siegertsbrunn; Gunther Sepp, Ottobrunn; Richard Benedikter, Putzbrunn; Werner Schnaebele, Wolfratshausen, all of Fed. Rep. of Germany

[73] Assignee: Messerschmitt-Boelkow-Blohm Gesellschaft mit beschraenkter Haftung, Munich, Fed. Rep. of Germany

[21] Appl. No.: 265,217

[22] Filed: Oct. 31, 1988

[30] Foreign Application Priority Data

Nov. 7, 1987 [DE] Fed. Rep. of Germany ....... 3737972

[51] Int. Cl.⁵ ............................................. G01B 11/26
[52] U.S. Cl. .................................... 356/152; 340/705;
340/980; 350/174; 356/1; 356/141; 358/104;
434/43; 434/44
[58] Field of Search ..................... 434/43, 44; 340/980,
340/705; 356/1, 141, 152; 350/174; 358/104

[56] References Cited

U.S. PATENT DOCUMENTS

| | | | |
|---|---|---|---|
| 3,666,887 | 5/1972 | Freeman | 350/174 |
| 3,678,283 | 7/1972 | Labaw | 356/152 |
| 4,348,185 | 9/1982 | Breglia et al. | 434/43 |
| 4,439,755 | 3/1984 | Larussa | 434/44 |
| 4,446,480 | 5/1984 | Breglia et al. | 340/705 |
| 4,722,601 | 2/1988 | McFarlane | 356/152 |
| 4,792,697 | 12/1988 | Le Parquier et al. | 356/152 |

FOREIGN PATENT DOCUMENTS

| | | | |
|---|---|---|---|
| 3426505 | 1/1985 | Fed. Rep. of Germany . | |
| 1527049 | 10/1978 | United Kingdom | 340/980 |

Primary Examiner—Stephen C. Buczinski
Attorney, Agent, or Firm—W. G. Fasse; D. H. Kane, Jr.

[57] ABSTRACT

A situation display system has a movable section for attachment to a helmet and a stationary section, including a stationary map providing a real map background for showing situation display elements on the map. The movable section is connected through a flexible cable to a device for the remote control of the situation display elements which are computer generated. By accurate measurements of the location of the helmet and its distance to the map, signals are provided which are processed independently of any movements of an operator wearing the helmet so that the elements are correctly displayed and seen on the map. Thus, a tactical situation display is obtained for a military command system.

8 Claims, 6 Drawing Sheets

SITUATION DISPLAY SYSTEM FOR ATTACHMENT TO A HEADGEAR

FIELD OF THE INVENTION

The invention relates to a situation display system for attachment to a headgear, wherein signs, lines, and symbols are superimposed on a real map background by means of a projector attached to the headgear such as a helmet.

BACKGROUND INFORMATION

Such situation display systems are known in different versions. All of these systems or devices, however, are subject to substantial problems. For example, the high information density of a tactical map causes a display problem. As a result, conventional situation display systems have not been capable of providing a topographic map display with a high resolution of detail.

German Patent Publication No. (DE-OS) 3,426,505 discloses a sighting device or view finder mounted to a helmet relative to a given or fixed reference field or image. In this known device, the sighting symbol is produced on the screen of a helmet mounted cathode ray tube. A semi-permeable mirror focusses the sighting symbol into the eye with reference to the background. This reference system is gyro-stabilized and is located at the helmet. The system according to German Patent Publication No. (DE-OS) 3,426,505 is also subject to the limitation that the image detail or image area is too small, namely maximally only 40×40 cm, whereas an image detail or image area of at least 100×100 cm is required. Another disadvantage is the volume of the apparatus and its relatively substantial weight which makes it inconvenient as a helmet attachment.

OBJECTS OF THE INVENTION

In view of the foregoing it is the aim of the invention to achieve the following objects singly or in combination:

to construct a situation display system which combines a conventional map display with the superimposing of additional information in the form of signs and symbols on the map display;

the superimposing of these symbols shall be individually controllable for each user or viewer of the system so that different viewers may be presented with information which is exclusively intended for that particular viewer; and to enable different operators to simultaneously project different informations onto the map so that each sees only the images intended for him while a main operator is able to see any information as desired.

SUMMARY OF THE INVENTION

According to the invention there is provided a situation display system for superimposing visible optical elements such as signs, lines, and symbols on or with respect to a real map background by means of a projector attached to a headgear, comprising at least three, preferably four, marking light sources arranged not on a line, but orthogonally to each other, for example luminescent diodes on the stationary map, and wherein as a sensor for the alignment, a position sensitive diode is arranged at the head of a viewer, for example, on a helmet or headband, said sensor being of a planar construction behind an objective of determined focal length, whereby at the edges of the position diode electrodes function as current dividers, which provide information regarding the position of the light spot in two orthogonal directions, said information being in the form of analog electrical values out of which, by means of a multiplex method, the angular position of the sensor at the helmet relative to the marking light sources is provided according to said analog electric values, out of which the projection direction for the mirrored-in symbols and the distance to the map are ascertained by means of a computer in real time, and wherein the superimposing of these symbols with respect to said real map is controllable individually for several viewers by a symbol remote control device.

The invention combines a cartographic display having a fine resolution, with the superimposing of modifiable information symbols on the map. The superimposing is individually controllable as desired by each viewer or operator. The combination is accomplished by a relatively simple technical effort and at modest expense in that a conventional map, such as a wall map having a 1 m × 1 m dimension and a scale of 1:50,000 or 1:500,000 is used and in that each operator is equipped with a small portable unit which electronically generates symbols that become individually visible on the map to the respective operator or to a supervising operator. These symbols are projected within the viewing field onto the map in such a way that they are visible to the respective operator or viewer under all occurring viewing situations as virtual images at the operator selected location on the map.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
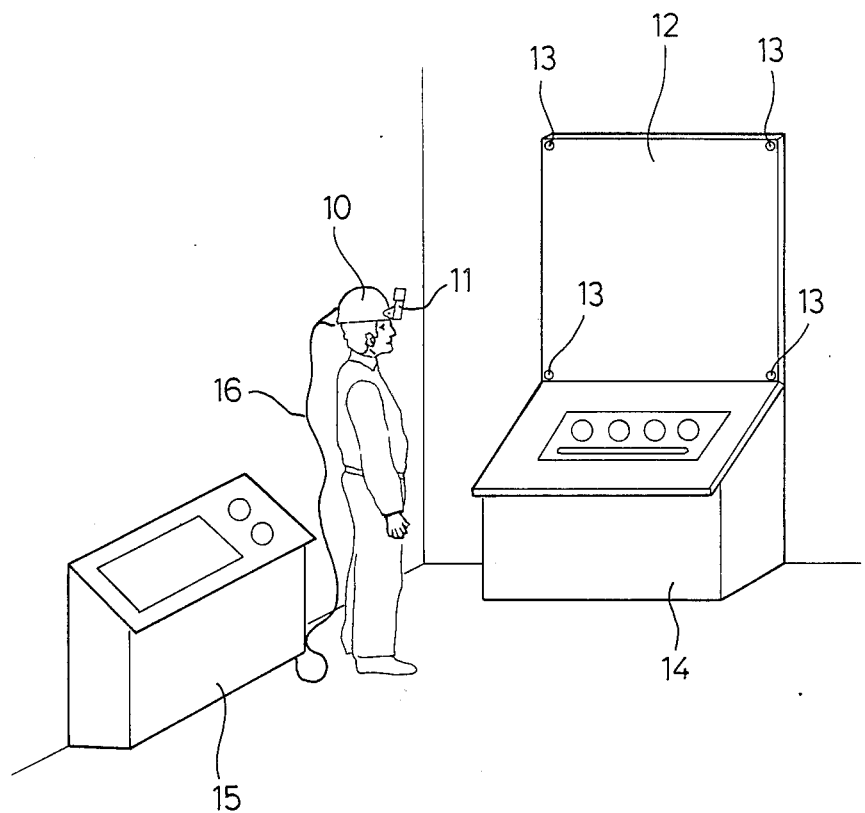
FIG. 1 is a simplified respective illustration of the situation display system according to the invention, showing the map and means for projecting symbols onto the map, as well as controlling the symbol projection.

FIG. 1 clarifies the construction and assembly of such a situation display system. For example, a wall map 12 having the dimension of 1 m × 1 m is secured to a panel or frame or to a wall. At each corner of the map surface there is arranged a marking or reference light source 13 such as luminescent diodes, forming four fixed points for the geometric determination of a location on the map and for a determination of the viewing direction of an operator or of several operators. This arrangement cooperates with a computer 14 including the required input means such as a keyboard operated by the operator or viewer.

Each operator has a helmet or a headband 10 to which the viewing apparatus 11 is mounted. The arrangement is such that the operator has a free view onto the map on the one hand, and, on the other hand, he or she has the ability to project onto the map images of signs, symbols, or lines or the like. Within certain limits this projection may be accomplished independently of the operator's position and independently of the orientation of his or her viewing direction. These projected signs, symbols, lines, or the like appear at the desired or predetermined location on the map substantially with the correct size and without any distortions. This will be described in more detail below. It should be mentioned here, however, that the viewing apparatus is so constructed that the operator is not unreasonably burdened by the weight of the apparatus, nor by its moment of inertia.

The system according to the invention has two main components, namely, the stationary section including the map 12, the computer 14, and so forth and the mobile section 10, 11 mounted to the helmet carried by the operator. To a certain extent the allocation of components to the stationary section or to the mobile section can be modified depending on the available parameters. Thus, normally, the stationary section will comprise the elements for controlling the projected information. These elements are assembled in the symbol remote control console 15. The stationary section will also include the position and directional control system including the computer 14 with its input keyboard The stationary system will further include the map 12 equipped with at least three, preferably four, reference light sources 13, one of which is arranged at each corner of the map and with an orthogonal orientation relative to one another. The reference light sources 13 may, for example, be luminescent diodes, so-called light emitting diodes. The mobile section 10, 11 is connected to the remote control console 15 of the stationary section by a flexible electrical conductor cable 16 as shown in FIG. 1.

For determining a location three light sources 13 not located on a straight line are sufficient as reference points. However, the computing steps required for a location determination can be substantially reduced by using four light sources. Thus using four sources is advantageous, especially in the light of the fact that real time calculations are required.

Figure 2:
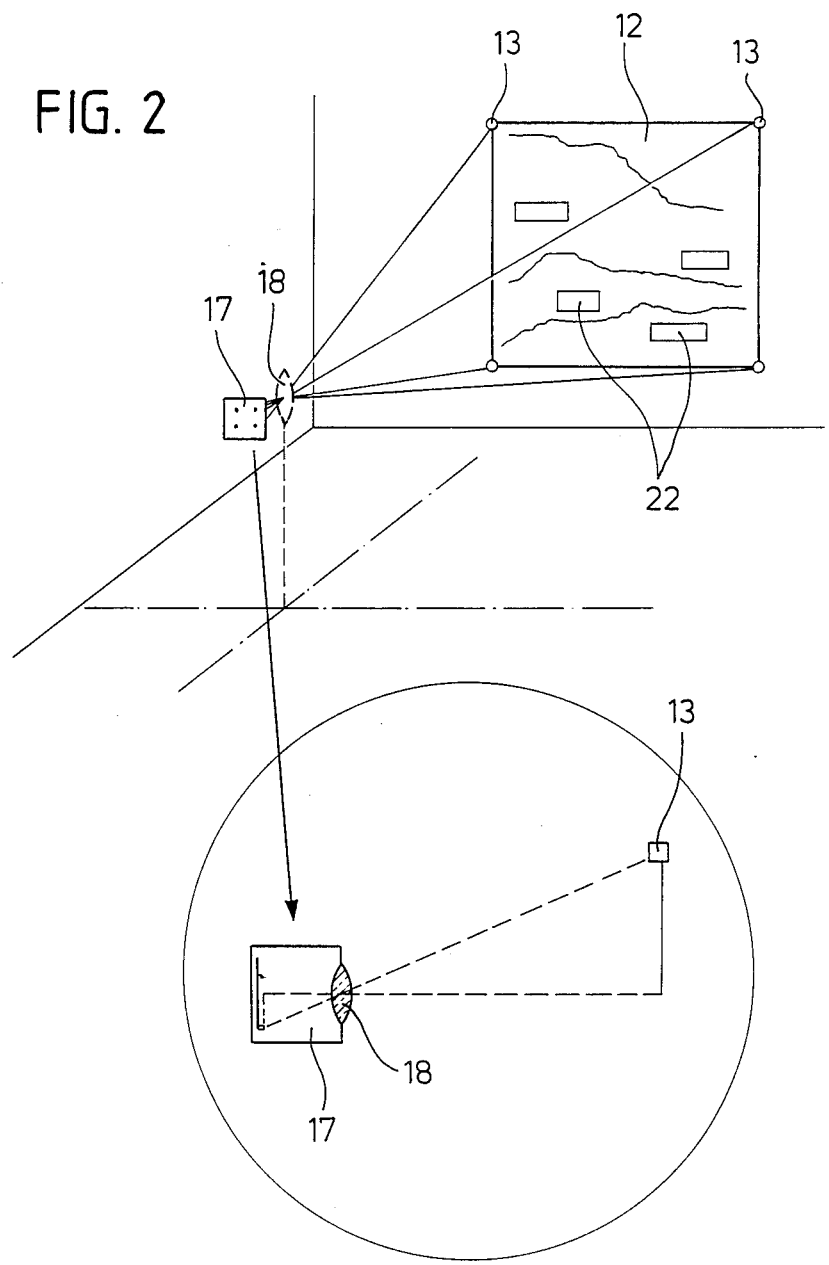
FIG. 2 is a schematic view similar to that of FIG. 1, showing a situation display and with means for determining the position and viewing direction of an operator.

As mentioned, the portable section 11 of the present situation display system is attached to the helmet 10 of the viewer. The portable section functions as a sensor for the sighting. For this purpose the portable section 11 comprises a position sensitive diode 17 having a certain surface area as shown in FIG. 2. The position sensitive diode 17 is located behind a lens or objective 18, please see also FIGS. 2 and 3. The lens or objective 18 has a focal length as required for the particular system. The position sensitive diode 17 and its objective 18 are located in a camera housing. Opposite edges of the position sensitive diode are provided with electrodes 17a which function as a current divider and provide signal information regarding the position of the light spot 22 in two orthogonal directions in the form of respective analog electrical signals. By performing a multiplexing operation it is possible to determine the angular position of the sensor 11 attached to the helmet 10, relative to all reference or marking light sources 13. This determination may be accomplished simultaneously or in a sufficiently rapid sequence one after the other. The analog electrical signals are converted in the computer 14 in real time for calculating the projection direction of the signs, symbols, or the like projected onto the map and the distance between the operator and the map. Communication between the mobile section 11 and the remote control console takes place through the above mentioned flexible electrical conductor cable 16.

Figure 3:
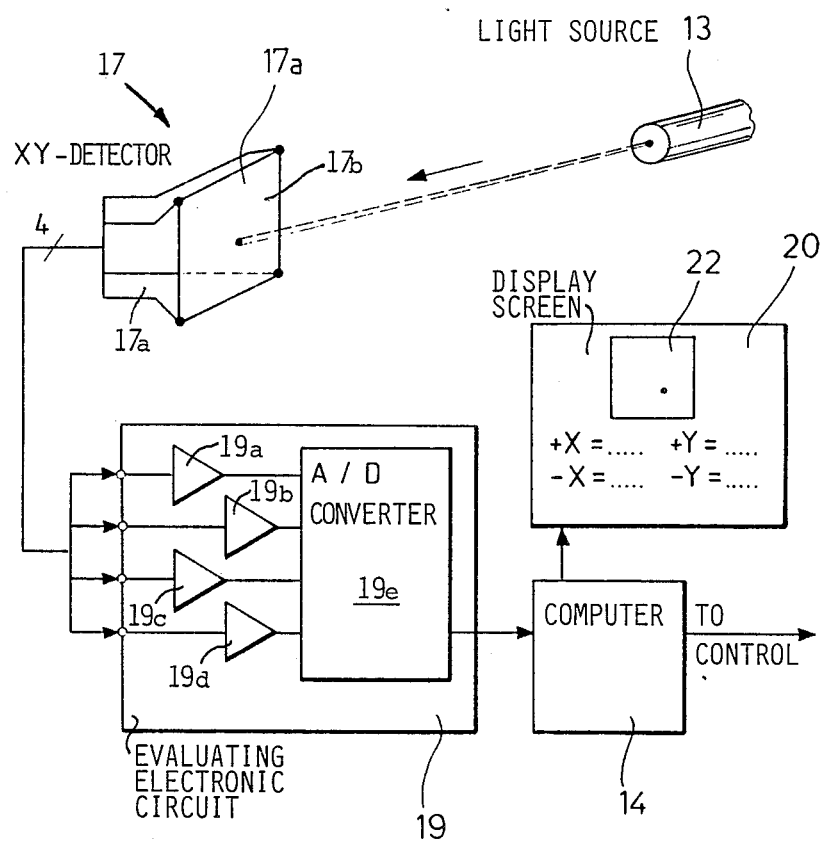
FIG. 3 is a block circuit diagram of the arrangement for determining the operator position and the orientation.
Figure 4:
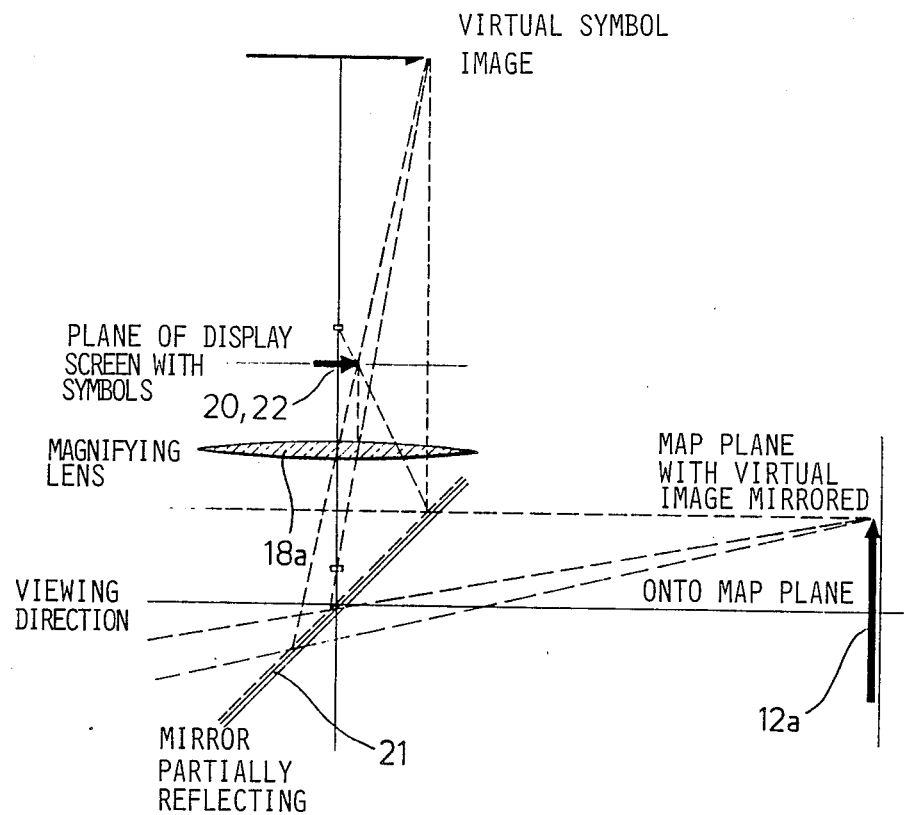
FIG. 4 is a schematic illustration of the geometry of the ray path for an optical imaging of the situation display.

FIG. 3 shows the arrangement of the position sensitive diode 17 with its electrodes 17a and a sensitive surface area 17b. FIG. 3 also shows the circuit arrangement connected to the outputs of the position sensor diode 17 including amplifiers 19a, 19b, 19c, and 19d. The outputs of the amplifiers are connected to an analog to digital converter 19e in a block 19 together with the amplifiers. The symbols 22 are superimposed within the viewing field or range of the operator on the image screen 20 of a small cathode ray tube attached to the helmet 10. However, the display does not need to be a cathode ray tube. Any other suitably small display may be used. The projection of the symbol 22 onto the map is accomplished with the aid of a semi-reflective or semi-permeable mirror 21 arranged at 45° to the plane of the monitor screen 20 as best seen in FIG. 4. A magnifying lens 18a is imposed in the beam path or head of the mirror 21. This lens 18a produces a virtual image of the monitor screen 20 on the map plane 12a.

FIG. 4 illustrates the beam path of the above described optical imaging, whereby for an improved clarity a slightly enlarged drawing scale has been used. The position of the symbol 22 on the monitor screen 20 is controlled by the computer of the symbol remote control 15 in such a manner that the location of the virtual images is visible on the image plane 12a independently of any head motions of the viewer and independently of the viewer's location in the room. Thus, the symbol is displayed at all times in the desired location.

Figure 5:
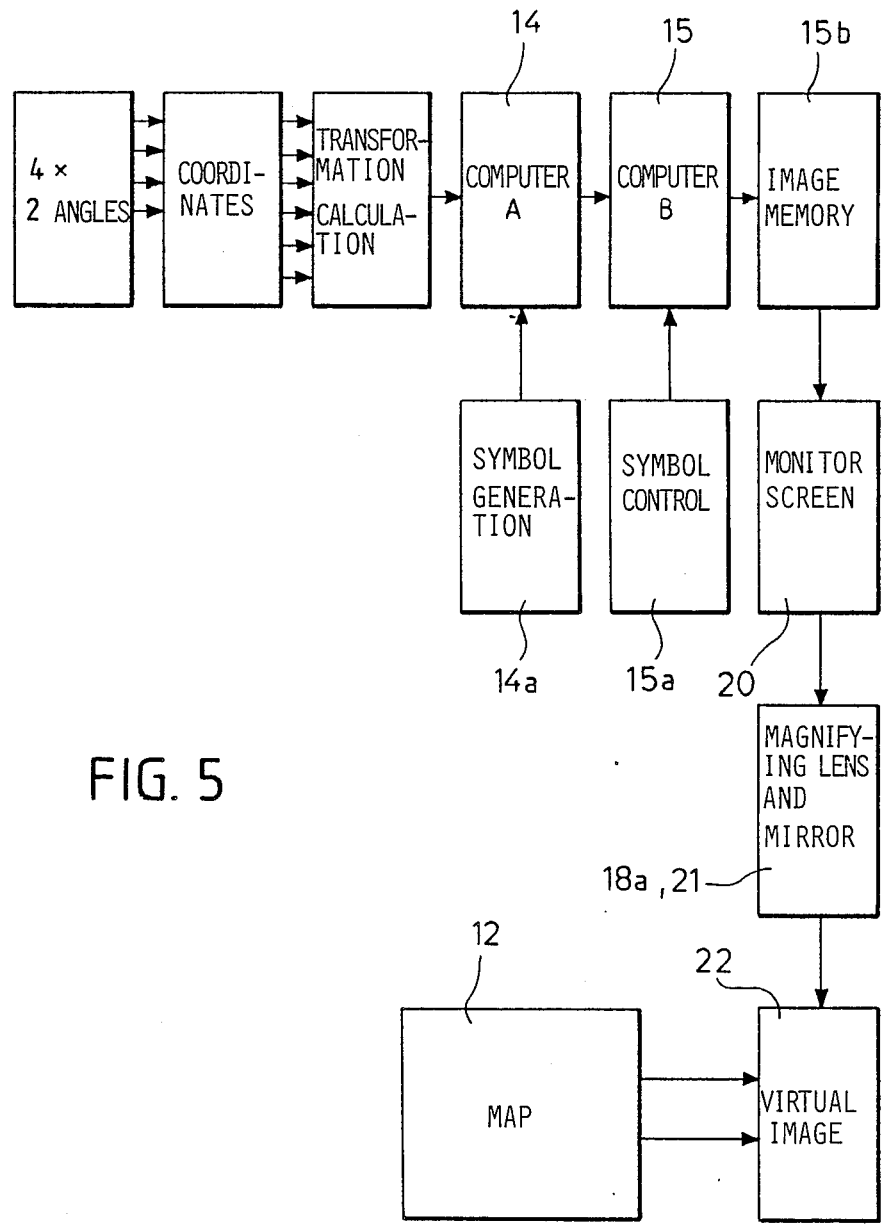
FIG. 5 is a block circuit diagram of the entire system for a situation display according to the invention.

FIG. 5 is a block diagram of the entire arrangement illustrating the cooperation of the individual components of the system. For measuring the location of the viewer, it is further possible to measure the viewer's distance from the reference light sources 13 in the corners of the map plane 12a. This distance measurement can be performed on a continuous basis by a conventional range finder not shown. The range finder may be attached to the helmet 10 or it may be part of the stationary section of the system, namely it may be located in the map plane, preferably at the location of one of the four reference light sources 13. If the range finder is located at the map, it is necessary to provide means for determining the orientation of the helmet relative to the map in all three directions of space.

Figure 6:
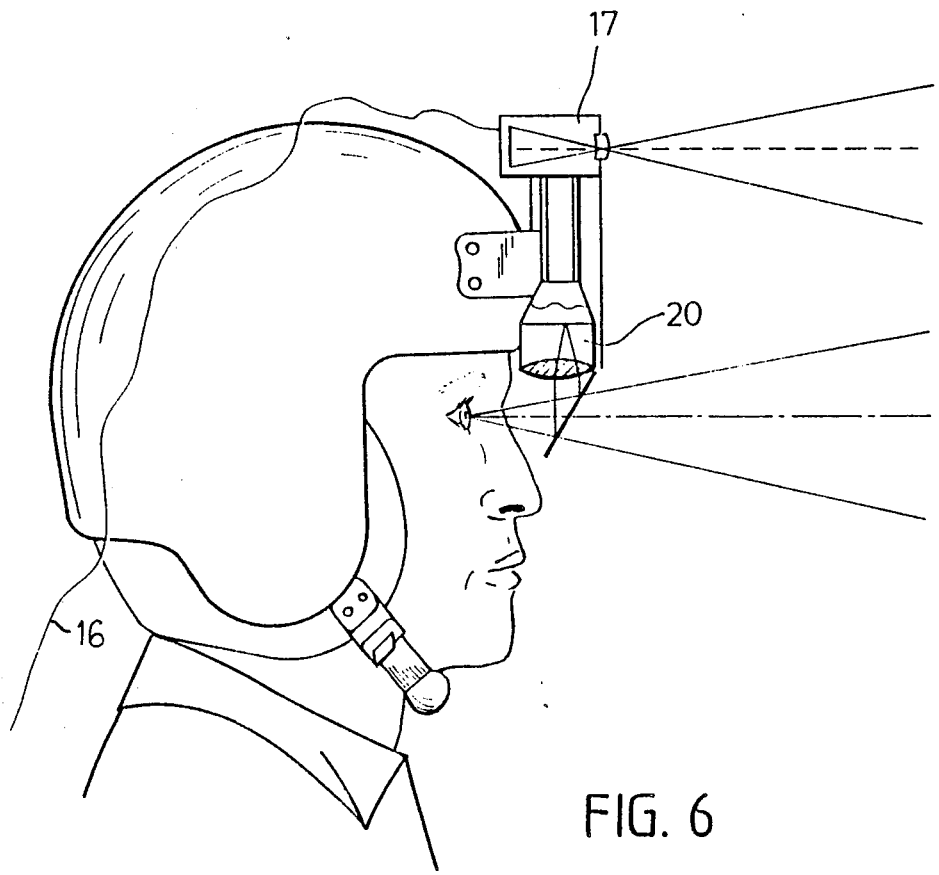
FIG. 6 shows a schematic illustration of the helmet to which the portable section of the present system is attached, said portable section including a monocular viewing device.

FIG. 6 shows the operator wearing the helmet equipped with the present portable section of the situation display system. The system includes, in addition to the area sensor 17 the monitor screen 20, the magnifying lens 18a and the semi-reflecting mirror 21 for the image viewing as well as a camera type multi-angle sensor with an objective not shown and the position sensor diode 17. In order to make the viewing of a map 12 possible, from different positions of the operator, and under different viewing angles, the surface area of the monitor display screen 20 that can be illuminated, should be sufficiently large so that the produced virtual image 22 has a length along its edge corresponding to about 1.5 to about 2 times the map dimensions when the operator is as close to the map as possible. On this virtual image the position of the symbol 22 and other displays are so controlled by the computer 15 that the display appears for the viewer at the desired location or at the required location of the map 12. Thus, the display is visible only for the particular operator and the projection of the symbols 22 on the map is not visible to any other operator. Hence, each operator can individually view the symbols he desires, whereby different operators may project different symbols, each for his own purposes.

Although the invention has been described with reference to specific example embodiments, it will be appreciated, that it is intended to cover all modifications and equivalents within the scope of the appended claims.

What we claim is:

1. A situation display system for superimposing visible elements with respect to oa real map background by means of a projector attached to a headgear (10), comprising at least three marking light sources (13) arranged not on a line, but orthogonally to each other, and wherein as a sensor (11) for the alignment, a position sensitive diode (17) is arranged at said headgear of a viewer, said sensor (11) being of a planar construction behind an objective (18) of determined focal length, said position sensitive diode (17) having electrodes (17a) along its edges functioning as current dividers for providing information regarding a position of a light spot in two orthogonal directions, said position information being in the form of analog electrical values for producing the angular position of said sensor (11) at said headgear relative to said marking light sources (13), and computer means (14) for ascertaining in real time from said angular position a projection direction for said visible elements and a distance between said headgear (10) and said real map (12), said system further comprising a symbol remote control device (15) for individually controlling said superimposing.

2. The system of claim 1, further comprising a monitoring screen (20) arranged at said headgear (10) for superimposing said visible elements (22) in a field of view of a viewer with a half reflecting mirror (21) inserted at an angle and with an objective (18a), whereby the latter produces with respect to a map plane (12a) a virtually appearing image of said monitoring screen (20).

3. The system of claim 2, wherein the position of said visible elements (22) on said monitoring screen (20) is controlled by said computer means (14) and said symbol remote control device (15) in such a way, that the position of a virtual image with respect to the map wall or with respect to the map plane (12a) is visible always in a desired spot independently of any head movements of a viewer and of his position in a room.

4. The system of claim 1, wherein the distance of a viewer from reference spots formed by said marking light sources (13) is continuously determined by said computer means (14) on the basis of measured values from a distance measuring means.

5. The system of claim 1, wherein said sensor (11) is constructed as a monocular viewing device which is assembled to comprise a monitor image screen (20), a magnifying lens (18a), a suitable half-reflecting mirror (21), and a chamber type multi-angle sensor having an objective and a position diode.

6. The system of claim 1, wherein said sensor (11) is connected through a flexible cable (16) with said symbol remote control device (15).

7. The system of claim 1, wherein said computer means ascertain said projection direction by performing a multiplexing operation.

8. The system of claim 1, wherein said symbol remote control device (15) is accessible to a plurality of operators, each of which can individually control a projection of said visible elements onto said real map without interfering with projections controlled by another operator.

* * * * *